US011335080B2

(12) United States Patent
Bosko et al.

(10) Patent No.: US 11,335,080 B2
(45) Date of Patent: May 17, 2022

(54) SYSTEM FOR SUGGESTING SEARCH TERMS

(71) Applicant: International Business Machines Corporation, Armonk, NY (US)

(72) Inventors: Christopher M. Bosko, Raleigh, NC (US); Bryan D. Osenbach, Cary, NC (US); Jeffrey B. Sloyer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 14/859,393

(22) Filed: Sep. 21, 2015

(65) Prior Publication Data

US 2017/0083633 A1    Mar. 23, 2017

(51) Int. Cl.
| | |
|---|---|
| *G06V 10/40* | (2022.01) |
| *G06F 16/9032* | (2019.01) |
| *G06V 20/40* | (2022.01) |
| *G10L 15/26* | (2006.01) |
| *G10L 25/54* | (2013.01) |
| *G06V 30/10* | (2022.01) |

(52) U.S. Cl.
CPC ........ *G06V 10/40* (2022.01); *G06F 16/90324* (2019.01); *G06V 20/40* (2022.01); *G06V 30/10* (2022.01); *G10L 15/26* (2013.01); *G10L 25/54* (2013.01)

(58) Field of Classification Search
CPC . G06K 9/46; G06F 17/3097; G06F 16/90324; G10L 15/26; G10L 25/54; G06V 10/40; G06V 20/40; G06V 30/10
USPC .......................................... 707/722
See application file for complete search history.

(56) References Cited

U.S. PATENT DOCUMENTS

| | | | | |
|---|---|---|---|---|
| 6,078,916 | A * | 6/2000 | Culliss | G06F 16/338 |
| 6,345,252 | B1 * | 2/2002 | Beigi | G06F 16/685 |
| | | | | 704/E15.045 |
| 8,069,151 | B1 * | 11/2011 | Crafford | G06F 11/1469 |
| | | | | 707/674 |
| 8,176,068 | B2 * | 5/2012 | Kunjithapatham | ......................... |
| | | | | G06F 16/7867 |
| | | | | 707/766 |
| 9,335,819 | B1 * | 5/2016 | Jaeger | G06F 3/0346 |
| 9,620,113 | B2 * | 4/2017 | Kennewick | G01C 21/3608 |

(Continued)

OTHER PUBLICATIONS

"Method of obtaining reference material based on TV advertisement content", An IP.com Prior Art Database Technical Disclosure, IP.com No. IPCOM000203585D, Publication: Jan. 28, 2011, 3 pages.

(Continued)

*Primary Examiner* — Ashish Thomas
*Assistant Examiner* — Abdullah A Daud
(74) *Attorney, Agent, or Firm* — William H. Hartwell; Daniel R. Simek (57) ABSTRACT

The method includes receiving, by one or more computer processors, data that includes at least one of audio data, video data, and optical data. The method further includes identifying, by one or more computer processors, keywords from the received data. The method further includes generating, by one or more computer processes, Internet search terms based upon the identified keywords. In some embodiments, the method further includes searching the Internet based upon the generated Internet search terms.

16 Claims, 3 Drawing Sheets

(56) References Cited

U.S. PATENT DOCUMENTS

| | | | | |
|---|---|---|---|---|
| 2002/0163500 | A1* | 11/2002 | Griffith | G06F 40/30 345/156 |
| 2005/0060401 | A1* | 3/2005 | Brown | H04L 63/083 709/224 |
| 2005/0144065 | A1* | 6/2005 | Calabria | G06Q 40/04 705/14.68 |
| 2006/0136378 | A1* | 6/2006 | Martin | G06F 16/9535 |
| 2007/0271262 | A1* | 11/2007 | Wang | G06F 16/951 707/999.005 |
| 2008/0033982 | A1* | 2/2008 | Parikh | G06F 16/31 707/999.102 |
| 2008/0319750 | A1* | 12/2008 | Potter | G10L 15/26 704/E15.045 |
| 2011/0055241 | A1* | 3/2011 | Lewis | G06F 16/951 707/766 |
| 2011/0289530 | A1 | 11/2011 | Dureau et al. | |
| 2012/0210213 | A1* | 8/2012 | Watanabe | G06F 40/109 715/277 |
| 2013/0283203 | A1* | 10/2013 | Batraski | G06F 16/438 715/783 |
| 2014/0188926 | A1 | 7/2014 | Chandel et al. | |
| 2014/0304753 | A1* | 10/2014 | Waltermann | H04N 21/84 725/109 |
| 2015/0213194 | A1* | 7/2015 | Wolf | G06V 30/40 705/3 |
| 2015/0289120 | A1* | 10/2015 | Harber | H04L 67/12 455/414.3 |
| 2015/0379098 | A1* | 12/2015 | Im | G06F 16/26 707/749 |
| 2016/0063059 | A1* | 3/2016 | Krauss | G06F 16/24539 707/767 |
| 2016/0156957 | A1* | 6/2016 | Yun | H04N 21/44226 725/14 |
| 2016/0189314 | A1* | 6/2016 | Nakayama | G06V 30/412 705/30 |
| 2016/0253428 | A1* | 9/2016 | Hasan | G06F 16/9535 707/754 |
| 2016/0261701 | A1* | 9/2016 | Dhawan | G06F 40/205 |
| 2016/0360264 | A1* | 12/2016 | Rajasekharan | G11B 27/10 |
| 2017/0223124 | A1* | 8/2017 | Dhawan | G06F 40/205 |
| 2018/0060818 | A1* | 3/2018 | Ishiyama | G06Q 10/103 |
| 2018/0150449 | A1* | 5/2018 | Lee | G06F 3/0482 |

OTHER PUBLICATIONS

"Streaming Google search for conference calls", An IP.com Prior Art Database Technical Disclosure, IP.com No. IPCOM000236036D, Publication: Apr. 2, 2014, 1 page.

* cited by examiner

SYSTEM FOR SUGGESTING SEARCH TERMS

BACKGROUND OF THE INVENTION

The present invention relates generally to Internet searching, and more particularly to providing search terms based on received content.

Television has increasingly become Internet driven. Many programs rely on the Internet as a means of bringing content to a viewer. Viewers are able to type in content that the viewers wish to search on the Internet into various search engine programs. The search engine programs search the keywords entered by a user, and typically utilize information that is manually entered by a user.

Program-generated search suggestions have become the standard through most search engines initiated through a computer. A search engine user interface typically uses a search box to allow a user to select from a drop down style of suggestions.

SUMMARY

Aspects of the present invention disclose a method, computer program product, and system for suggesting search terms. The method includes receiving, by one or more computer processors, data that includes at least one of audio data, video data, and optical data. The method further includes identifying, by one or more computer processors, keywords from the received data. The method further includes generating, by one or more computer processes, Internet search terms based upon the identified keywords. In some embodiments, the method further includes searching the Internet based upon the generated Internet search terms.

DETAILED DESCRIPTION

Embodiments of the present invention recognize a user may conduct a search on the Internet to gather information based upon a topic the user recently saw, heard, or spoke about. Embodiments of the present invention further recognize a user may inquire about specific topics based upon a television show being viewed or audio media being consumed by the user.

Some embodiments of the present invention recognize that a user may be interested in searching for something of interest that the user has just viewed on the television.

Implementation of embodiments of the invention may take a variety of forms, and exemplary implementation details are discussed subsequently with reference to the Figures.

Figure 1:
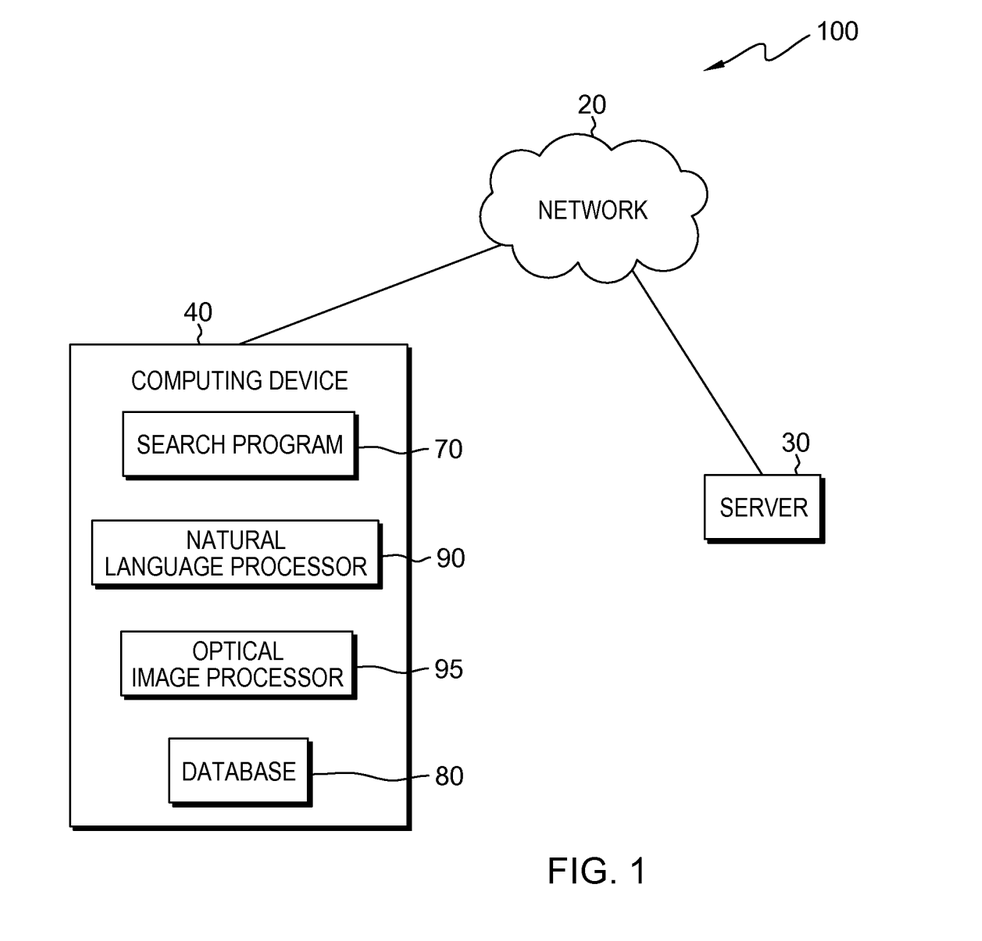
FIG. 1 is a functional block diagram illustrating a distributed data processing environment, in accordance with one embodiment of the present invention.

The present invention will now be described in detail with reference to the Figures. FIG. 1 is a functional block diagram of computing system 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing system 100 includes server 30 and computing device 40, interconnected over network 20. Network 20 may be a local area network (LAN), a wide area network (WAN), such as the Internet, a cellular data network, any combination thereof, or any combination of connections and protocols that will support communications between server 30 and computing device 40, in accordance with embodiments of the invention. Network 20 may include wired, wireless, or fiber optic connections. Network 20 includes one or more wired and/or wireless networks that are capable of receiving and transmitting data, voice, and/or video signals, including multimedia signals that include voice, data, and video information. Computing system 100 may include additional computing devices, servers, or other devices not shown that are able to communicate with computing device 40 and server 30 via network 20.

Server 30 may be a management server, a web server, or any other electronic device or computing system capable of processing program instructions and receiving and sending data. In some embodiments, server 30 may be a laptop computer, a tablet computer, a netbook computer, a personal computer (PC), a desktop computer, or any programmable electronic device capable of communicating with computing device 40 via network 20. In other embodiments, server 30 may represent a server computing system utilizing multiple computers as a server system, such as in a cloud computing environment. In the depicted embodiment, server 30 is connected to computing device 40 through network 20. In other embodiments, server 30 may include search program 70, database 80, and/or other components, as depicted and described in further detail with respect to FIG. 3.

Computing device 40 may be a desktop computer, a laptop computer, a netbook computer, or a tablet computer. In general, computing device 40 may be any electronic device or computing system capable of processing program instructions, sending and receiving data, and communicating with server 30 via network 20. In the depicted embodiment, computing device 40 contains search program 70, database 80, natural language processor 90, and optical image processor 95. In other embodiments, computing device 40 may include search program 70, database 80, natural language processor 90, optical image processor 95, and/or other components, as depicted and described in further detail with respect to FIG. 3.

Search program 70 provides a list of suggested search terms to a user of computing device 40. In some embodiments, search program 70 may generate a list of possible search terms based upon received audio or visual input. In some embodiments, search program 70 provides a suggested search term related to a user's current television viewing activity. For example, a user of computing device 40 is watching a basketball game on television, and the announcer mentions the death of a basketball coach. The user of computing device 40 opens up a search engine browser on computing device 40. Search program 70 detects the user is going to search for something on the Internet. Search program 70 may constantly listen to audio and updates a possible Internet search list. Once a user opens the search engine browser, search program 70 suggests search terms in the search engine browser based upon the content that computing device 40 received.

In another embodiment, a user is watching television using a viewing device. For example, a user is watching television using a viewing device (e.g., optical image processing device, wearable computing devices, etc.) worn over the user's eyes in the same manner that glasses are worn. The viewing device may detect the content and send the content to optical image processor 95. Optical image processor 95 may then send the context of what a user is viewing and generate search terms based upon the current live data viewing stream. In some embodiments, search program 70 may use an image recognition algorithm to determine images received by computing device 40. In various embodiments, search program 70 may recognize logo information for a particular channel and utilize image recognition and text recognition algorithms to locate and read the close captioning on a television to determine the context. Search program 70 may determine the context of the received images and can suggest search terms. In yet another embodiment, search program 70 receives audio information through a microphone that may be a part of computing device 40. For example, computing device 40 may detect a user is watching a show about fishing. A user of computing device 40 may activate a search engine to understand a fishing term. Search program 70 may suggest a series of search terms based upon the audio.

In some embodiments, search program 70 may be a client-side program located on a client device (e.g., computing device 40). Search program 70 may send and receive data from a server-based program (not depicted). In an example, computing device 40 does not contain the processing power to generate searches or perform natural language processing. Search program 70 may send recorded audio or visual data to a server search program located on another computing device (e.g., server 30), where the server search program can generate proposed searches and send data containing proposed searches to the client device (e.g., computing device 40). In some embodiments, search program 70 may receive data associated with audio data, video data, or optical data that the user is consuming.

Database 80 may be a repository that may be written to and/or read by search program 70. A database is an organized collection of data. In some embodiments, various terms, words, and/or sentences may be stored in database 80 based upon frequency of use on computing device 40. In other embodiments, database 80 may store previous searches, which contain specific search terms for a user based upon a preset user profile. In the depicted embodiment, database 80 resides on computing device 40. In other embodiments, database 80 may reside on a server, another computing device, or independently as a standalone database that is capable of communicating with server 30 and computing device 40 via network 20.

Natural language processor 90 analyzes and processes the words received by computing device 40 to interface with a computing device 40 in both written and spoken context. Natural language processor 90 uses natural human language instead of computer languages. In one embodiment, speech to text may filter the language spoken on a television program and captured by an audio device on computing device 40. For example, natural language processor 90 may use deep analytics, named entity extraction, and co-reference resolution to ascertain audio information and use the information to generate suggested search terms. In some embodiments, natural language processor 90 may be a subprogram of search program 70. In other embodiments, natural language processor 90 may be located on server 30 or elsewhere within computing system 100 and connected to search program 70 via network 20.

Optical image processor 95 analyzes visual images. In various embodiments, optical image processor 95 analyzes visual images using an algorithm. In an embodiment, an image is received by a viewing device, and optical image processor 95 generates a set of characteristics or parameters used by search program 70 to generate a search term. In one embodiment, a user is watching television using a viewing device. For example, a user is watching television using an optical image processing device worn over the user's eyes in the same manner glasses are worn. Search program 70 may detect the content of what a user is viewing and propose search terms based upon the current live data viewing stream.

Figure 2:
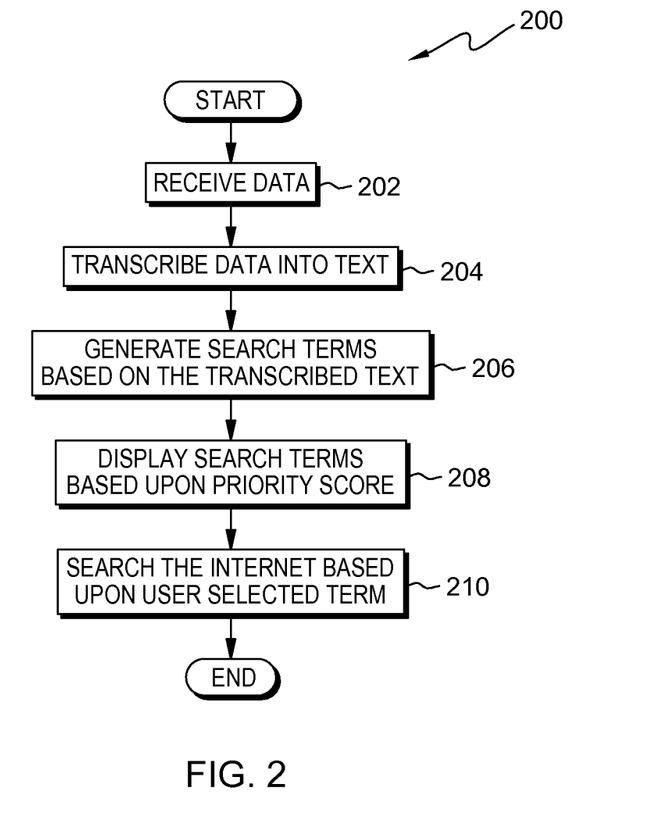
FIG. 2 depicts a flowchart depicting operational steps of a program for suggesting search terms based on received content, executing within the computing system of FIG. 1, in accordance with one embodiment of the present invention.

FIG. 2 is a flowchart depicting operational steps of program 200, which is a function of search program 70, in accordance with an embodiment of the present invention. In some embodiments, the operational steps of program 200 begin in response to search program 70 receiving audio data. In other embodiments, the operational steps of program 200 begin in response to search program 70 receiving optical data. In yet other embodiments, program 200 begins in response to a user prompt or a user opening a search browser.

In step 202, program 200 receives data. In various embodiments, data received by program 200 may be in the form of audio, optical, or video data. In various embodiments, program 200 receives audio data via a microphone on computing device 40. For example, a microphone located on computing device 40 receives audio data, and program 200 identifies the data being received. In another example, program 200 transcribes the audio data as the microphone receives the data in real time. In another embodiments, program 200 may receive audio date via an email or an Internet website. In some examples, program 200 may identify the audio data in a video that is playing on computing device 40, a television, or cinematic theater. In another example, program 200 may identify the audio data in a recording of a meeting or audio file. In yet another example, program 200 may identify an article or word document that is on computing device 40.

In some embodiment, program 200 receives optical data via a viewing device (e.g., wearable computing device, computerized glasses, etc.) In an example, computerized glasses receive optical data and send the data to computing device 40. Optical image processor 95 then processes the data to form word descriptions and sentences. In another example, computing device 40 receives the optical data and sends the optical data to server 30. An image processing program on server 30 processes the optical data to form word and sentence descriptions for the optical data and sends the textual data back to computing device 40. Program 200 may store the received data in a database (e.g., database 80) or review the data as program 200 receives the data. In another embodiment, the optical data may contain words (e.g., closed caption text, billboards, articles, etc.), and program 200 may extract the words from the optical data via an image processor (e.g., optical image processor 95).

Program 200 transcribes data into text (step 204). In various embodiments, program 200 transcribes audio data into words. In an example, program 200 contains a subprogram for converting speech to text. In another example, program 200 sends audio data to a transcription program (not depicted) that converts audio data into text. The transcription program then sends the text to program 200. In some embodiments, a transcription program resides on computing device 40 and transcribes the audio data into words. The transcription program may store the transcribed data in a database (e.g., database 80) or send the transcribed data to program 200.

In various embodiments, a computing device (e.g., computing device 40) may be connected to a device creating audio, optical, or video data. Program 200 may extract closed caption information from a device creating the audio, optical, or video data, and therefore, receive text of the audio, optical, or video data.

Program 200 generates search terms based on the transcribed text (step 206). In various embodiments, program 200 generates search terms based on specific content contained in the received data from step 202. In an example, program 200 searches for keywords, such as proper nouns, dates, preset words, etc. In some embodiments, program 200 may search for reoccurring keywords that are repeated within a preset time. In another example, program 200 utilizes natural language processing to determine a subject from each sentence of the transcribed text. Program 200 then looks for repeat words within a short timeframe (e.g., 30 seconds) to generate search terms. In yet another embodiments, program 200 cross references transcribed text against previous search history. If program 200 locates matches, then program 200 may generate a list of search terms based upon the matches.

In an example, program 200 performs a search based upon a user watching a sporting event. An announcer of the event discusses the history of the current coach. Program 200 detects the context of the discussion of the coach utilizing context determination algorithms, such as natural language processing or other methods known by one skilled in the art. Program 200 determines the discussion pertains to the history of the coach. Program 200 generates possible search terms regarding the history of the coach (e.g., coach's name, coach's name+team, coach's name+history, etc.). In another embodiment, program 200 receives optical data and utilizes a picture from the optical data as a search term. For example, a user is watching television using a viewing device worn over the user's eyes in the same manner glasses are worn. Program 200 detects the content on the television and generates search terms based upon the current live data viewing stream. In various embodiments, program 200 may use an image recognition algorithm to determine content received by a viewing device. In one embodiment, program 200 may identify logo information for a particular channel or program. In another example, program 200 may use image recognition and text recognition algorithms to locate and read the close captioning on a television to identify content.

In some embodiments, program 200 may send information to a server (e.g., server 30), where a server search program is located (not depicted) that generates search terms. In an example, computing device 40 is a wearable device which receives audio data. A client based version of search program 70 sends the audio data to server 30, which includes a server version of search program 70. The server version of search program 70 is capable of performing natural language processing and transcribing audio data. The server version of search program 70 generates a list of search terms and sends the terms to computing device 40.

In one embodiment, by using semantic analysis, program 200 can identify closed captioning data or transcribed audio data by breaking a textual sentence into different portions to determine nouns, verbs, adjectives, subject matters, actions, etc. In an embodiment, program 200 looks for keywords that trigger actions. In an example, program 200 generates search suggestions for names and recognizes the names as nouns or subjects of a sentence. In some embodiments, speech to text may filter the language spoken on a television program and captured by an audio device on computing device 40. For example, program 200 may use deep analytics, named entity extraction, and co-reference resolution to ascertain audio information and use this information to generate suggested search terms. In one example, program 200 may receive the text of a conversation between speaker one and speaker two regarding items that they need at a grocery store. Program 200 may then extract information stating that speaker two should go to the grocery store and create a shopping list. Program 200 suggests search terms for the items being discussed.

In yet other embodiments, program 200 may search the Internet based upon generated search term to determine which search terms generate results similar to keywords in transcribed text. In an example, program 200 may generate a list of 15 search terms. Program 200 conducts 15 separate searches on the Internet based on the 15 search terms. Program 200 then determines which of the 15 search terms resulted in an Internet search with the best results (e.g., search results that contain the most uses of keywords from transcribed text).

Program 200 displays search terms based upon a priority score (step 208). In various embodiments, program 200 may organize the generated search terms based upon the likely selection by a user. In an example, program 200 generates a list of 20 search terms based upon received data over the last 20 minutes. Program 200 may list the search terms, giving the most recently generated term is the highest score and displayed highest on the list and giving the oldest generated search term the lowest priority score and is displayed lowest on the list. In another example, program 200 may determine that the most recently generated search term is unlikely to be selected, as a user might not be able to access computing device 40 within the short period of time. In some examples, a 10-second delay may be implemented between the generation of a search term and the received data, which would allow a user time to access the computing device. Program 200 may track the average amount of time it takes for a user to select a search time after the related audio data is received and assign a priority score based on the elapsed time. In yet other examples, program 200 may list search terms that are similar to previous search terms or Internet history higher on a generated search term list. In still other embodiments, program 200 may not assign a priority score but rather just display search terms in alphabetical order, order generated, random, etc.

Program 200 searches the Internet based upon user selected terms (step 210). In various embodiments, program 200 may generate search terms; however, program 200 may not search the Internet based upon the generated search terms unless a user provides input prompting a search. In some embodiments, program 200 may not search the Internet but rather just generate search terms. In an example, program 200 generates search terms, but a user copies one of the generated search terms and pastes the generated search term in a web browser that searches the Internet based upon the selected search term. In another example, program 200 may send the selected generated search term to a web browser of the user's choosing.

In one embodiment, program 200 is constantly performing searches and updating the search based upon received data. For example, program 200 is constantly receiving audio, video, or optical data, determining context, and providing search terms. In one embodiment, program 200 may automatically perform searches. For example, program 200 will automatically suggest terms and search the Internet based on the context of how a name, event, or entity was used when a user opens a web browser or activates a search engine. In some embodiments, program 200 can recognize the context of a historical event and generate search suggestions based upon the event. In an example, a user is watching a program about the Civil War, program 200 suggests terms based upon the context, generals, presidents, famous battles, historical sites, or even other documentaries, of the Civil War program.

In another embodiment, program 200 may not suggest search terms unless a user initiates program 200. For example, program 200 may receive input and send said input to a server. Program 200 may have a setting that a user may toggle on/off, which permits a user to open a web browser or search engine without program 200 automatically generating search terms. In another example, a user is watching a basketball game on television, and the announcers mention the death of a basketball coach. The user opens up a search engine browser on computing device 40, and program 200 provides search terms based upon the context of a user's activity. Program 200 generates search suggestions based on the context of the conversation, e.g., winning percentages of the deceased coach, number of championships won, reflections from outstanding players, etc. Program 200 constantly updates and performs searches based upon the received data from step 202. Program 200 suggests search terms in the search engine browser based upon the live content that computing device 40 is receiving.

Figure 3:
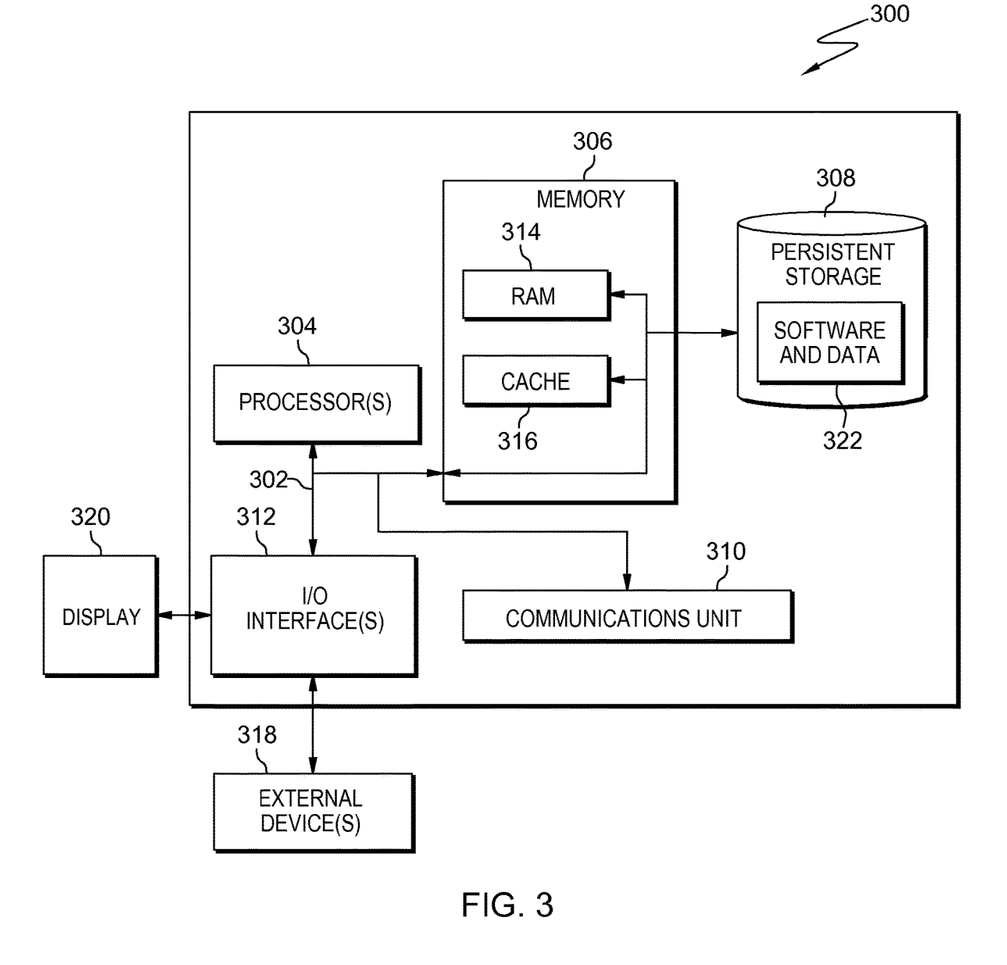
FIG. 3 depicts a block diagram of components of the server and/or the computing device of FIG. 1, in accordance with another embodiment of the present invention.

FIG. 3 depicts computer system 300, which is an example of a system that includes components of server 30 and/or computing device 40. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, and/or some other suitable input device. External device(s) 308 can also include portable computer readable storage media such as, for example, thumb drives, portable optical or magnetic disks, and memory cards. Software and data used to practice embodiments of the present invention, e.g., search program 70, database 80, natural language processor 90, and optical image processor 95 can be stored on such portable computer readable storage media and can be loaded onto persistent storage 305 of server 30 via I/O interface(s) 306 of server 30. Software and data used to practice embodiments of the present invention, e.g., search program 70, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for suggesting search terms, the method comprising:
   receiving, by one or more computer processors, data that includes at least two of audio data, video data, and optical data;
   transcribing, by one or more computer processors, the audio data in the received data into text;
   processing, by one or more computer processors, the optical data to form text descriptions, wherein the text descriptions are word and sentence descriptions of the optical data;

identifying, by one or more computer processors, keywords from the received data by utilizing natural language processing on the text, wherein keywords are one or more nouns repeated within a threshold timeframe from the transcribed audio data and the processed optical data;

identifying, by one or more processors, an Internet search history;

generating, by one or more computer processes, Internet search terms based upon the identified keywords and the identified Internet search history, wherein executing a search using the Internet search terms generates results containing the identified keywords; and generating, by one or more computer processors, one or more priority scores for the generated search terms corresponding to the identified Internet search history and the identified reoccurring keywords, wherein each of the one or more priority scores corresponds to an average amount of time before a user begins to interact with the corresponding generated search term.

2. The method of claim 1, wherein receiving data that includes at least two of audio data, video data, and optical data, comprises:

receiving, by one or more computer processors, data associated with content being displayed on a device, wherein the received data includes at least one of audio data, video data, and optical data; and wherein the received data comprises one or more of: television, cinematic, and streaming video content.

3. The method of claim 2, wherein the device is a television.

4. The method of claim 1, further comprising:

searching, by one or more computer processors, the Internet based upon one or more of the generated Internet search terms; and in response to a user indicating to display search results, displaying, by one or more computer processors, the results of the Internet search.

5. The method of claim 1, further comprising:

identifying, by one or more computer processors, reoccurring keywords within a preset time; and generating, by one or more processors, one or more priority scores for the generated search terms corresponding to the identified Internet search history and the identified reoccurring keywords.

6. The method of claim 1, further comprising:

searching, by one or more computer processors, the Internet based upon the generated search terms for websites;

reviewing, by one or more computer processors, the websites for a number of keywords found on the websites; and displaying, by one or more computer processors, the websites in order based upon the density of keywords found.

7. The method of claim 1, wherein the audio data is received from a human.

8. The method of claim 1, wherein generating Internet search terms based upon the identified keywords comprises:

identifying, by one or more computer processors a time threshold; and generating Internet search terms for the at least one of audio data, video data, and optical data within the time threshold.

9. A computer program product for suggesting search terms, the computer program product comprising:

one or more computer readable storage media and program instructions stored on the one or more computer readable storage media, the program instructions comprising:

program instructions to receive data that includes at least two of audio data, video data, and optical data;

program instructions to transcribe the audio data in the received data into text;

program instructions to process the optical data to form word and sentence descriptions for the optical data in text;

program instructions to identify keywords from the received data by utilizing natural language processing on the text, wherein keywords are one or more nouns repeated within a threshold timeframe from the transcribed audio data and the processed optical data;

program instructions to identify an Internet search history;

program instructions to generate Internet search terms based upon the identified keywords and the identified Internet search history, wherein executing a search using the Internet search terms generates results containing the identified keywords; and program instructions to generate one or more priority scores for the generated search terms corresponding to the identified Internet search history and the identified reoccurring keywords, wherein each of the one or more priority scores corresponds to an average amount of time before a user begins to interact with the corresponding generated search term.

10. The computer program product of claim 9, wherein program instructions to receive data that includes at least two of audio data, video data, and optical data, comprises program instructions to:

receive data associated with content being displayed on a device, wherein the received data includes at least one of audio data, video data, and optical data; and wherein the received data comprises one or more of: television, cinematic, and streaming video content.

11. The computer program product of claim 10, wherein program instructions to receive data associated with content being displayed on a device, wherein the device is a television.

12. The computer program product of claim 9, further comprising program instructions to:

search the Internet based upon one or more of the generated Internet search terms; and in response to a user indicating to display search results, display the results of the Internet search.

13. The computer program product of claim 9, further comprising program instructions to:

identify reoccurring keywords within a preset time; and generate one or more priority scores for the generated search terms corresponding to the identified Internet search history and the identified reoccurring keywords.

14. A computer system for suggesting search terms, the computer system comprising:

one or more computer processors;

one or more computer readable storage media;

program instructions stored on the computer readable storage media for execution by at least one of the one or more computer processors, the program instructions comprising:

program instructions to receive data that includes at least two of audio data, video data, and optical data;

program instructions to transcribe the audio data in the received data into text;

program instructions to process the optical data to form word and sentence descriptions for the optical data in text;

program instructions to identify keywords from the received data by utilizing natural language processing on the text, wherein keywords are one or more nouns repeated within a threshold timeframe from the transcribed audio data and the processed optical data;

program instructions to identify an Internet search history;

program instructions to generate Internet search terms based upon the identified keywords and the identified Internet search history, wherein executing a search using the Internet search terms generates results containing the identified keywords; and program instructions to generate one or more priority scores for the generated search terms corresponding to the identified Internet search history and the identified reoccurring keywords, wherein each of the one or more priority scores corresponds to an average amount of time before a user begins to interact with the corresponding generated search term.

15. The computer system of claim 14, wherein program instructions to receive data that includes at least two of audio data, video data, and optical data, comprises program instructions to:

receive data associated with content being displayed on a device, wherein the received data includes at least one of audio data, video data, and optical data; and wherein the received data comprises one or more of: television, cinematic, and streaming video content.

16. The computer system of claim 15, wherein program instructions to receive data associated with content being displayed on a device, wherein the device is a computerized glasses.

* * * * *